United States Patent [19]
Paradis

[11] Patent Number: 5,996,868
[45] Date of Patent: Dec. 7, 1999

[54] UTILITY CHEST

[76] Inventor: Arthur C. Paradis, 378 Intervale Rd., Canterbury, N.H. 03224

[21] Appl. No.: 09/156,088

[22] Filed: Sep. 17, 1998

[51] Int. Cl.[6] .................................................. B60R 9/00
[52] U.S. Cl. ........................... 224/404; 224/539; 224/542
[58] Field of Search ..................................... 224/404, 539, 224/542; 296/37.6; D12/423, 426

[56] References Cited

U.S. PATENT DOCUMENTS

| | | | |
|---|---|---|---|
| D. 370,200 | 5/1996 | Garoutte | D12/423 |
| 4,733,898 | 3/1988 | Williams | 296/37.6 |
| 4,789,195 | 12/1988 | Fletcher | 296/37.6 |
| 4,946,215 | 8/1990 | Taylor | 296/37.6 |
| 5,568,890 | 10/1996 | Magee et al. | 224/542 |
| 5,657,916 | 8/1997 | Tackett | 224/404 |

*Primary Examiner*—Stephen P. Garbe

[57] ABSTRACT

A utility chest for providing storage space on the load bed of a vehicle includes a housing designed for placement on a load bed of a vehicle. The housing is generally rectangular in configuration and has a top, a bottom, a front, a back, and a pair of sides extending between the front and back of the housing. Each of sides of the housing has spaced apart front and back fillers outwardly extending therefrom. Each pair of front and back fillers define a space therebetween for receiving a wheel well. The back of the housing has a pair of drawers each designed for holding items therein.

12 Claims, 3 Drawing Sheets

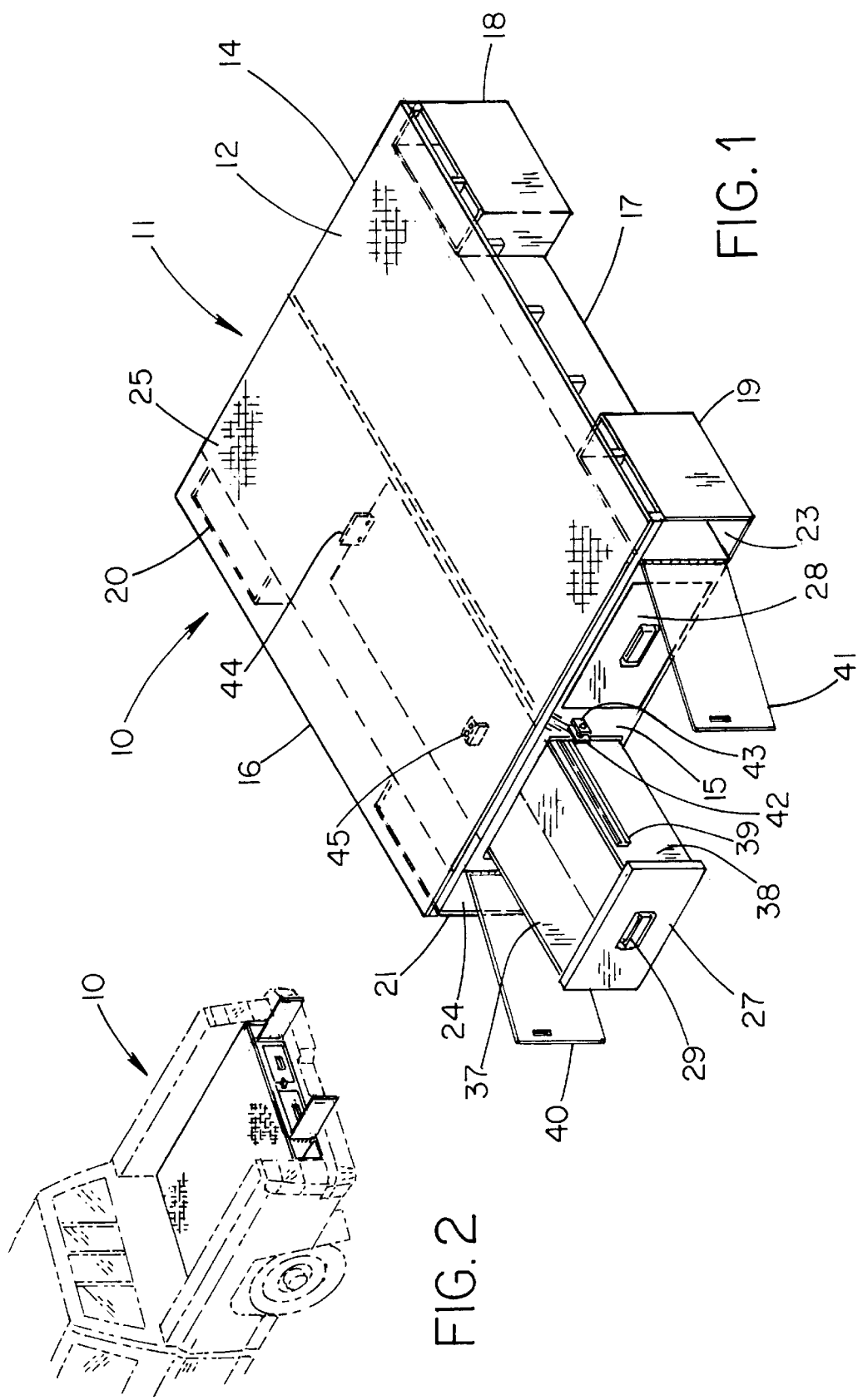

UTILITY CHEST

BACKGROUND OF THE INVENTION

1. Field of the Invention

The present invention relates to storage units for the load bed of a vehicle and more particularly pertains to a new utility chest for providing storage space on the load bed of a vehicle.

2. Description of the Prior Art

The use of storage units for the load bed of a vehicle is known in the prior art. More specifically, storage units for the load bed of a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,573,731; U.S. Pat. No. 5,603,439; U.S. Pat. No. Des. 370,200; U.S. Pat. No. 4,789,195; U.S. Pat. No. 5,568,890; and U.S. Pat. No. 2,572,774.

While these devices fulfill their respective, particular objectives and requirements, the aforementioned patents do not disclose a new utility chest. The inventive device includes a housing designed for placement on a load bed of a vehicle. The housing is generally rectangular in configuration and has a top, a bottom, a front, a back, and a pair of sides extending between the front and back of the housing. Each of sides of the housing has spaced apart front and back fillers outwardly extending therefrom. Each pair of front and back fillers define a space therebetween for receiving a wheel well. The back of the housing has a pair of drawers each designed for holding items therein.

In these respects, the utility chest according to the present invention substantially departs from the conventional concepts and designs of the prior art, and in so doing provides an apparatus primarily developed for the purpose of providing storage space on the load bed of a vehicle.

SUMMARY OF THE INVENTION

In view of the foregoing disadvantages inherent in the known types of storage units for the load bed of a vehicle now present in the prior art, the present invention provides a new utility chest construction wherein the same can be utilized for providing storage space on the load bed of a vehicle.

The general purpose of the present invention, which will be described subsequently in greater detail, is to provide a new utility chest apparatus and method which has many of the advantages of the storage units for the load bed of a vehicle mentioned heretofore and many novel features that result in a new utility chest which is not anticipated, rendered obvious, suggested, or even implied by any of the prior art storage units for the load bed of a vehicle, either alone or in any combination thereof.

To attain this, the present invention generally comprises a housing designed for placement on a load bed of a vehicle. The housing is generally rectangular in configuration and has a top, a bottom, a front, a back, and a pair of sides extending between the front and back of the housing. Each of sides of the housing has spaced apart front and back fillers outwardly extending therefrom. Each pair of front and back fillers define a space therebetween for receiving a wheel well. The back of the housing has a pair of drawers each designed for holding items therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new utility chest apparatus and method which has many of the advantages of the storage units for the load bed of a vehicle mentioned heretofore and many novel features that result in a new utility chest which is not anticipated, rendered obvious, suggested, or even implied by any of the prior art storage units for the load bed of a vehicle, either alone or in any combination thereof.

It is another object of the present invention to provide a new utility chest which may be easily and efficiently manufactured and marketed.

It is a further object of the present invention to provide a new utility chest which is of a durable and reliable construction.

An even further object of the present invention is to provide a new utility chest which is susceptible of a low cost of manufacture with regard to both materials and labor, and which accordingly is then susceptible of low prices of sale to the consuming public, thereby making such utility chest economically available to the buying public.

Still yet another object of the present invention is to provide a new utility chest which provides in the apparatuses and methods of the prior art some of the advantages thereof, while simultaneously overcoming some of the disadvantages normally associated therewith.

Still another object of the present invention is to provide a new utility chest for providing storage space on the load bed of a vehicle.

Yet another object of the present invention is to provide a new utility chest which includes a housing designed for placement on a load bed of a vehicle. The housing is generally rectangular in configuration and has a top, a bottom, a front, a back, and a pair of sides extending between the front and back of the housing. Each of sides of the housing has spaced apart front and back fillers outwardly extending therefrom. Each pair of front and back fillers define a space therebetween for receiving a wheel well. The back of the housing has a pair of drawers each designed for holding items therein.

Still yet another object of the present invention is to provide a new utility chest that is sturdy enough to permit the resting of loads thereon so that the load bed of the vehicle may still be used to carry cargo when the utility chest is provided on the load bed.

Even still another object of the present invention is to provide a new utility chest that provides drawers for storing items in a secure manner and also protected from the weather.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new utility chest in use on the load bed of a truck according to the present invention.

FIG. 2 is a schematic perspective view of the present invention.

DESCRIPTION OF THE PREFERRED EMBODIMENT

Figure 3:
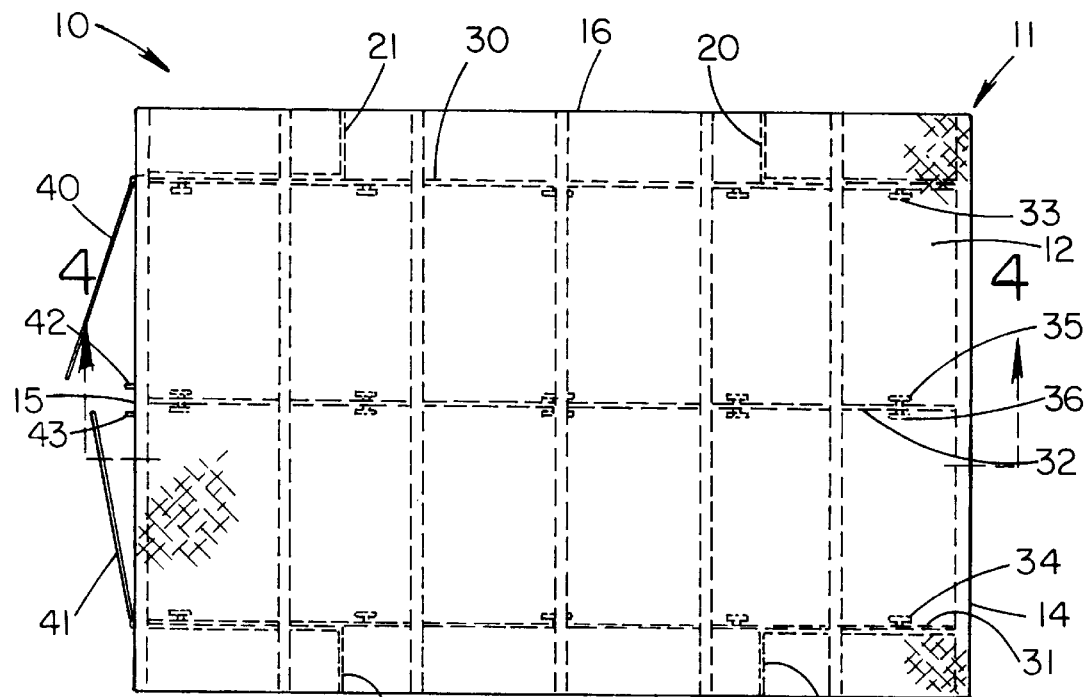
FIG. 3 is a schematic top view of the present invention.
Figure 4:
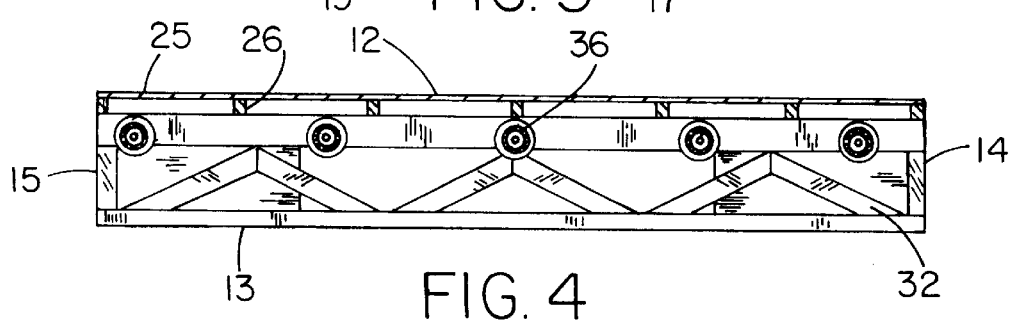
FIG. 4 is a schematic cross sectional view of the present invention taken from line 4—4 of FIG. 3.
Figure 6:
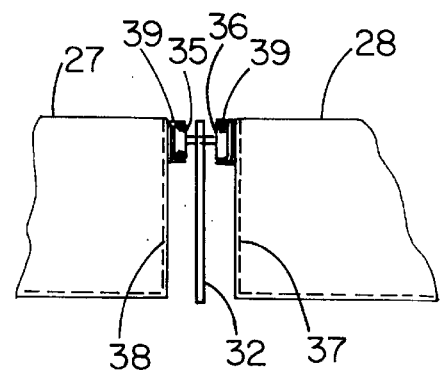
FIG. 6 is a schematic partial side view of the third row of gussets and the relationship of the rollers to the tracks.
Figure 5:
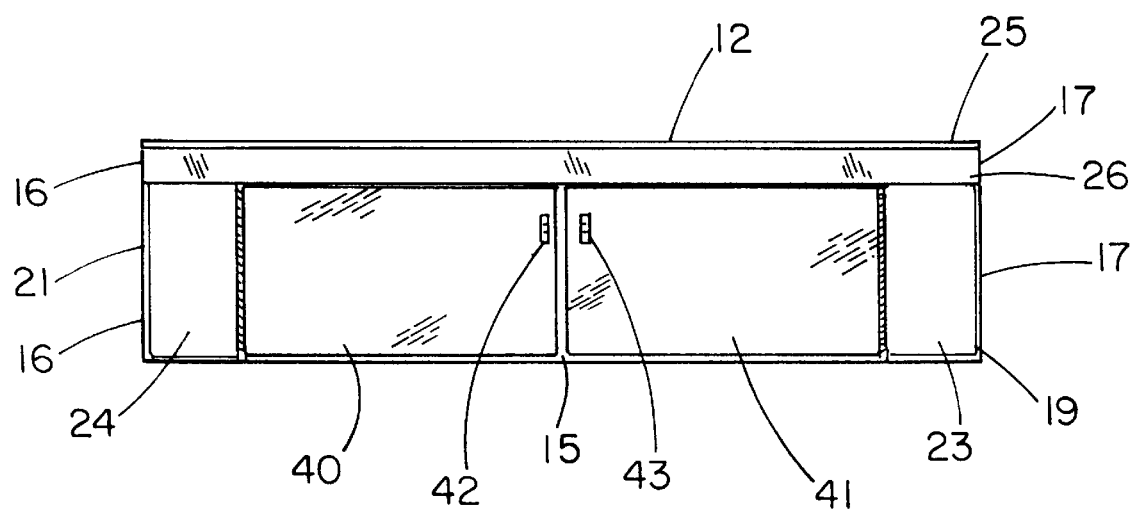
FIG. 5 is a schematic side view of the back of the housing of the present invention.

With reference now to the drawings, and in particular to FIGS. 1 through 6 thereof, a new utility chest embodying the principles and concepts of the present invention and generally designated by the reference numeral 10 will be described.

As best illustrated in FIGS. 1 through 6, the utility chest 10 generally comprises a housing 11 designed for placement on a load bed of a vehicle. The housing 11 is generally rectangular in configuration and has a top 12, a bottom 13, a front 14, a back 15, and a pair of sides 16,17 extending between the front and back 14,15 of the housing 11. Each of sides 16,17 of the housing 11 has spaced apart front and back fillers 18,20,19,21 outwardly extending therefrom. Each pair of front and back fillers 18,19,20,21 define a space therebetween for receiving a wheel well. The back 15 of the housing 11 has a pair of drawers 27,28 each designed for holding items therein.

In use, the utility chest 10 is designed for placement on a load bed of a vehicle. The load bed typically has front and rear ends, and a pair of spaced apart side walls extending between the front and rear ends of the load bed. The load bed also has a pair of upwardly extending wheel wells located adjacent the side walls of the load bed.

In closer detail, the utility chest 10 includes a housing 11 designed for placement on a load bed of a vehicle. The housing 11 is generally rectangular in configuration and has a top 12, a bottom 13, a front 14, a back 15, and a pair of sides 16,17 extending between the front and back 14,15 of the housing 11. The bottom 13 of the housing 11 is designed for resting on the load bed of the vehicle. The front 14 of the housing 11 is designed for positioning towards the front end of the load bed of the vehicle. The back 15 of the housing 11 is designed for positioning towards the rear end of the load bed of the vehicle. One of the sides of the housing is designed for positioning adjacent a first side wall of the load bed of the vehicle and the other side of the housing is designed for positioning adjacent a second side wall of the load bed of the vehicle.

Each of sides 16,17 of the housing 11 has spaced apart front and back fillers 18,20,19,21 outwardly extending therefrom. The front and back fillers 18,20,19,21 are generally rectangular in configuration. The front fillers 18,20 are positioned adjacent the front 14 of the housing 11 and the back fillers 19,21 are positioned adjacent the back 15 of the housing 11. The front and back fillers 18,20,19,21 of each side of the housing 11 are designed for receiving a wheel well of the load bed of the vehicle therein. The front and back fillers 18,19 of the one side of the housing 11 define a generally rectangular space 22 therebetween designed for receiving a wheel well adjacent the first side wall of the load bed of the vehicle. Similarly, the front and back fillers 20,21 of the other side of the housing 11 define a space therebetween designed for receiving a wheel well adjacent the second side wall of the load bed of the vehicle. Preferably, each of the back fillers 19,21 has an opening 23,24 therein located adjacent the back 15 of the housing 11. The openings 23,24 of the back fillers 19,21 are designed for receiving items into the back fillers 19,21 for storage in the back fillers 19,21.

The top 12 of the housing 11 preferably comprises a generally planar rectangular upper flooring panel 25 and a plurality of elongate floor joists 26 beneath the upper flooring panel 25. Ideally, the plurality of floor joists 26 comprise seven floor joists 26 for providing sufficient support to the upper flooring panel 25. The upper flooring panel 25 extends across the front 14, back 15 and sides 16,17 of the housing 11 such that the upper flooring panel 25 covers the front and back fillers 18,20,19,21 and the spaces 22 between the front back fillers 19,21. The floor joists 26 extend generally parallel to one another with each of the floor joists 26 having a length extending between the sides 16,17 of the housing 11. The floor joists 26 are arranged in a row extending between the front and back 14,15 of the housing 11. Ideally, the floor joists 26 are spaced apart at generally equal intervals in the row.

The back 15 of the housing 11 has a pair of drawers 27,28 each designed for holding items therein. Each of the drawers 27,28 has a length defined in a direction extending between the front and back 14,15 of the housing 11. Preferably, the length of each of the drawers 27, 28 in a range that is greater than about one-half the length of the housing 11 and slightly less than the length of the housing 11. In use, the drawers 27,28 may be pulled out of the housing 11 from the back 15 of the housing 11 to gain access to the items in the drawers 27,28 and also pushed back into the housing 11 to shut the drawers 27,28. Each of the drawers 27,28 preferably has a handle 29 to aid pulling out of the drawer 27,28 from the housing 11. Ideally, each of the drawers 27,28 has a stop 44 at the back of the drawer 27,28 which abuts against a corresponding rest 45 in the housing 11 to prevent pulling of the drawer 27,28 completely out of the housing 11.

The housing 11 has at least one row of gussets therein extending between the front and back 14,15 of the housing 11. Each gusset extends between the top 12 and bottom 13 of the housing 11 to support the top 12 of the housing 11 above the bottom 13 of the housing 11. Preferably, the housing 11 has three rows of gussets therein extending between the front and back 14,15 of the housing 11. A first row of gussets 30 is positioned adjacent one of the sides of the housing. A second row of gussets 31 is positioned adjacent another of the sides of the housing. A third row of gussets 32 interposed between the first and second rows of gussets generally at a midpoint between the sides 16,17 of the housing 11. The third row of gussets 32 also extends between the drawers 27,28.

The first and second rows of gussets each have a row of rollers 33,34 rotatably mounted thereto adjacent the top 12 of the housing 11. The third row of gussets 32 has a pair of rows of rollers 35,36 rotatably mounted thereto adjacent the top 12 of the housing 11. One of the rows of rollers of the third row of gussets 32 faces the row of rollers 33 of the first row of gussets 30, and the other row of rollers of the third row of gussets 32 faces the row of rollers 34 of the second row of gussets 31. Each of the rows of rollers has a length extending between the front and back 14,15 of the housing 11 and generally parallel to the sides 16,17 of the housing 11.

Each of the drawers 27,28 has a pair of side panels 37,38 each having has a track 39 mounted thereto. The track of one side of a first of the drawers is rested on the row of rollers 33 of the first row of gussets 30 and the track of another side of the first drawer is rested on the one row of rollers of the third row of gussets 32. The track of one side of a second of the drawers is rested on the row of rollers 34 of the second row of gussets 31 and the track of another side of the second drawer is rested on the another row of rollers of the third row of gussets. The tracks 39 of the drawers 27,28 are rested on the rollers to aid sliding in and out of the drawers 27,28 by the rolling of the rollers along the lengths of the tracks 39.

The back 15 of the housing 11 has a pair of doors 40,41 substantially covering the drawers 27,28 to block access to the drawers 27,28. One of the doors is pivotally coupled to the back 15 of the housing 11 adjacent one side of the housing and the other door is pivotally coupled to the back 15 of the housing 11 adjacent another side of the housing. Each of the doors 40,41 is pivotable between an open position where the doors 40,41 extend outwards from the back 15 of the housing 11 and a closed position where the doors 40,41 cover the drawers 27,28. Each of the doors 40,41 preferably has a loop 42,43 outwardly extending therefrom. The loops 42,43 of the doors 40,41 are designed for extending the bolt of a padlock therethrough when the doors 40,41 cover the drawers 27,28 to prevent unauthorized access to the drawers 27,28.

The housing 11 has a length defined between the front and back 14,15 of the housing 11. The housing 11 has a inner width defined between the sides 16,17 of the housing 11 and a outer width defined between the front fillers 18,20. The housing 11 also has a height defined between the top 12 and bottom 13 of the housing 11. In an ideal illustrative embodiment, the length of the housing 11 is about 6 feet, the inner width of the housing 11 is about 3 feet and 3 inches, the outer width of the housing 11 is about 4 feet and 3 inches, and the height of the housing is about 1 foot and 1¼ inches. The upper flooring sheet and joists ideally have a thickness of about 2¼ inches, with the upper floor sheet ideally having a thickness of about ¼ inch. Each filler ideally has a length of about 1 foot 6 inches and a width of about 6 inches. This ideal illustrative embodiment provides sufficient strength to support heavy loads on the upper flooring sheet and provides adequate storage space in the drawers 27,28 and back fillers 19,21 for storing a variety of tools therein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A utility chest for placement on a load bed of a vehicle, the load bed having front and rear ends, and a pair of spaced apart side walls extending between the front and rear ends of the load bed, the load bed having a pair of upwardly extending wheel wells located adjacent the side walls of the load bed, said utility chest comprising:

a housing adapted for placement on a load bed of a vehicle, said housing being generally rectangular in configuration and having a top, a bottom, a front, a back, and a pair of sides extending between the front and back of the housing;

said bottom of said housing being adapted for resting on the load bed of the vehicle, said front of said housing being adapted for positioning towards the front end of the load bed of the vehicle, said back of said housing being adapted for positioning towards the rear end of the load bed of the vehicle, one of said sides of said housing being adapted for positioning adjacent a first side wall of the load bed of the vehicle, the other of said sides of said housing being adapted for positioning adjacent a second side wall of the load bed of the vehicle;

each of sides of said housing having spaced apart front and back fillers outwardly extending therefrom, said front and back fillers being generally rectangular in configuration, said front fillers being positioned adjacent said front of said housing, said back fillers being positioned adjacent said back of said housing;

said front and back fillers of said one side of said housing defining a space therebetween adapted for receiving a wheel well adjacent the first side wall of the load bed of the vehicle, said front and back fillers of said other side of said housing defining a space therebetween adapted for receiving a wheel well adjacent the second side wall of the load bed of the vehicle; and said back of said housing having a pair of drawers each adapted for holding items therein.

2. The utility chest of claim 1, wherein each of said back fillers has an opening therein located adjacent said back of said housing adapted for receiving items into said back fillers for storage in said back fillers.

3. The utility chest of claim 1, wherein said top of said housing comprises a generally planar rectangular upper flooring panel and a plurality of elongate floor joists beneath said upper flooring panel.

4. The utility chest of claim 3, wherein said upper flooring panel extend across said front, back and sides of said housing such that said upper flooring panel covers said front and back fillers and said spaces between said front back fillers.

5. The utility chest of claim 3, wherein said floor joists extend generally parallel to one another.

6. The utility chest of claim 5, wherein each of said floor joists has a length extending between said sides of said housing, said floor joists being arranged in a row extending between said front and back of said housing.

7. The utility chest of claim 6, wherein said floor joists are spaced apart at generally equal intervals in said row.

8. The utility chest of claim 1, wherein said housing has at least one row of gussets therein extending between said front and back of said housing, each gusset extending between said top and bottom of said housing to support said top of said housing above said bottom of said housing.

9. The utility chest of claim 8, wherein said housing has three rows of gussets therein extending between said front and back of said housing, a first row of gussets being positioned adjacent one of said sides of said housing, a second row of gussets being positioned adjacent another of said sides of said housing and a third row of gussets interposed between said first and second rows of gussets generally at a midpoint between said sides of said housing, said third row of gussets extending between said drawers.

10. The utility chest of claim 1, wherein said back of said housing has a pair of doors substantially covering said drawers, one of said doors being pivotally coupled to said back of said housing adjacent one side of said housing, another of said doors being pivotally coupled to said back of said housing adjacent another side of said housing.

11. The utility chest of claim 10, wherein each of said doors has a loop outwardly extending therefrom, said loops of said doors being adapted for extending the bolt of a padlock therethrough when said doors cover said drawers.

12. A utility chest for placement on a load bed of a vehicle, the load bed having front and rear ends, and a pair of spaced apart side walls extending between the front and rear ends of the load bed, the load bed having a pair of upwardly extending wheel wells located adjacent the side walls of the load bed, said utility chest comprising:

a housing adapted for placement on a load bed of a vehicle, said housing being generally rectangular in configuration and having a top, a bottom, a front, a back, and a pair of sides extending between the front and back of the housing;

said bottom of said housing being adapted for resting on the load bed of the vehicle, said front of said housing being adapted for positioning towards the front end of the load bed of the vehicle, said back of said housing being adapted for positioning towards the rear end of the load bed of the vehicle, one of said sides of said housing being adapted for positioning adjacent a first side wall of the load bed of the vehicle, the other of said sides of said housing being adapted for positioning adjacent a second side wall of the load bed of the vehicle;

each of sides of said housing having spaced apart front and back fillers outwardly extending therefrom, said front and back fillers being generally rectangular in configuration, said front fillers being positioned adjacent said front of said housing, said back fillers being positioned adjacent said back of said housing;

said front and back fillers of said one side of said housing defining a space therebetween adapted for receiving a wheel well adjacent the first side wall of the load bed of the vehicle, said front and back fillers of said other side of said housing defining a space therebetween adapted for receiving a wheel well adjacent the second side wall of the load bed of the vehicle;

each of said back fillers having an opening therein located adjacent said back of said housing;

said housing having a length defined between said front and back of said housing;

said top of said housing comprising a generally planar rectangular upper flooring panel and a plurality of elongate floor joists beneath said upper flooring panel;

said upper flooring panel extending across said front, back and sides of said housing such that said upper flooring panel covers said front and back fillers and said spaces between said front back fillers;

said floor joists extending generally parallel to one another, each of said floor joists having a length extending between said sides of said housing, said floor joists being arranged in a row extending between said front and back of said housing, said floor joists being spaced apart at generally equal intervals in said row;

said back of said housing having a pair of drawers each adapted for holding items therein, each of said drawers having a length defined in a direction extending between said front and back of said housing, wherein said length of each of said drawers is greater than about one-half said length of said housing and less than said length of said housing;

said housing having at least one row of gussets therein extending between said front and back of said housing, each gusset extending between said top and bottom of said housing to support said top of said housing above said bottom of said housing;

wherein said housing has three rows of gussets therein extending between said front and back of said housing, a first row of gussets being positioned adjacent one of said sides of said housing, a second row of gussets being positioned adjacent another of said sides of said housing and a third row of gussets interposed between said first and second rows of gussets generally at a midpoint between said sides of said housing;

said third row of gussets extending between said drawers, said first and second rows of gussets each having an a row of rollers rotatably mounted thereto adjacent said top of said housing;

said third row of gussets having a pair of rows of rollers rotatably mounted thereto adjacent said top of said housing, one of said rows of rollers of said third row of gussets facing said row of rollers of said first row of gussets, another of said row of rollers of said third row of gussets facing said row of rollers of said second row of gussets;

each of said rows of rollers having a length extending between said front and back of said housing and generally parallel to said sides of said housing;

each of said drawers having a pair of side panels, each side panel of each drawer having a track mounted thereto;

said track of one side of a first of said drawers being rested on said row of rollers of said first row of gussets, said track of another side of said first drawer being rested on said one row of rollers of said third row of gussets;

said track of one side of a second of said drawers being rested on said row of rollers of said second row of gussets, said track of another side of said second drawer being rested on said another row of rollers of said third row of gussets;

said tracks of said drawers being rested on said tracks to aid sliding in and out of said drawers by the rolling of said rollers along said lengths of said tracks;

said back of said housing having a pair of doors substantially covering said drawers, one of said doors being pivotally coupled to said back of said housing adjacent one side of said housing, another of said doors being pivotally coupled to said back of said housing adjacent another side of said housing; and each of said doors having a loop outwardly extending therefrom, said loops of said doors being adapted for extending the bolt of a padlock therethrough when said doors cover said drawers.

* * * * *